(12) United States Patent
Jung

(10) Patent No.: US 8,188,975 B2
(45) Date of Patent: May 29, 2012

(54) METHOD AND APPARATUS FOR CONTINUOUS KEY OPERATION OF MOBILE TERMINAL

(75) Inventor: Ra-Mi Jung, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 403 days.

(21) Appl. No.: 12/500,562

(22) Filed: Jul. 9, 2009

(65) Prior Publication Data

US 2010/0013772 A1    Jan. 21, 2010

(30) Foreign Application Priority Data

Jul. 15, 2008    (KR) ........................ 10-2008-0068614

(51) Int. Cl.
*G09G 5/08* (2006.01)
(52) U.S. Cl. .................... 345/163; 345/157; 345/173
(58) Field of Classification Search .................. 345/156, 345/169, 157, 160, 161–163, 166, 168, 172, 345/173
See application file for complete search history.

(56) References Cited

U.S. PATENT DOCUMENTS

| | | | |
|---|---|---|---|
| 2003/0107547 A1* | 6/2003 | Kehlstadt et al. | 345/156 |
| 2007/0046633 A1* | 3/2007 | Hirshberg | 345/168 |
| 2007/0052689 A1* | 3/2007 | Tak | 345/173 |
| 2007/0262957 A1* | 11/2007 | Seon | 345/157 |
| 2007/0273651 A1* | 11/2007 | Chiang et al. | 345/163 |

* cited by examiner

*Primary Examiner* — Amare Mengistu
*Assistant Examiner* — Hong Zhou
(74) *Attorney, Agent, or Firm* — Jefferson IP Law, LLP

(57) ABSTRACT

A method for providing a continuous key operation in a mobile terminal that uses an input unit for detecting position movement of an object relative to the input unit depending on a change of an input signal, and a mobile terminal implementing the method, is provided. In the method, whether position movement is detected through the input unit is determined. When the position movement is detected, whether a continuous operation control key is actuated within a predefined time is determined. When the continuous operation control key is actuated within the predefined time, an operation corresponding to the detected position movement is repeatedly performed. The method for the continuous key operation of the mobile terminal provides convenience to a user who uses a directional key service through an optical mouse and a touchscreen.

23 Claims, 6 Drawing Sheets

METHOD AND APPARATUS FOR CONTINUOUS KEY OPERATION OF MOBILE TERMINAL

PRIORITY

This application claims the benefit under 35 U.S.C. §119 (a) of a Korean patent application filed in the Korean Intellectual Property Office on Jul. 15, 2008 and assigned Serial No. 10-2008-0068614, the entire disclosure of which is hereby incorporated by reference.

BACKGROUND OF THE INVENTION

1. Field of the Invention

The present invention relates to an input unit for recognizing position movement according to a change of an input signal in a mobile terminal. More particularly, the present invention relates to a method and an apparatus for continuous key operation that uses an input unit for recognizing position movement of an object relative to the input unit according to a change of an input signal.

2. Description of the Related Art

An optical mouse denotes a mouse that projects light onto an object and is used to move a cursor displayed on a screen by detecting movement of an object relative to the mouse using light reflected off the object. That is, the optical mouse sends a coordinate determined according to a change of position of the object to a terminal. A terminal controls the movement of the cursor displayed on the screen based on the coordinate provided from the optical mouse.

A recently developed optical mouse, referred to as an 'optical joystick', may be used to move a cursor on a screen of a mobile terminal by detecting a finger's movement. That is, the mobile terminal controls the movement of a cursor on the screen by detecting a change of an image (fingerprint shape or characteristic of a finger surface) using light from a Light Emitting Diode (LED), which is a light source that may be used in the optical joystick. In addition, the mobile terminal may be provided with a directional key operation using the optical joystick as illustrated in FIG. 1.

FIGS. 1A and 1B illustrate directional key operations using an optical mouse according to the conventional art.

More particularly, FIG. 1A illustrates a directional key operation using an optical joystick according to the conventional art, and FIG. 1B illustrates a continuous directional key operation using an optical joystick according to the conventional art.

As illustrated in FIG. 1A, when a coordinate change in a downward direction is detected by the optical joystick, a mobile terminal provides an operation of a down directional key (↓).

At this point, since the optical joystick detects a coordinate change with respect to only a change of an object, the operation of FIG. 1A should be repeatedly performed as illustrated in FIG. 1B in order to continuously provide the operation of the down directional key (↓).

As described above, the optical joystick provides a cursor movement or a directional key operation using a change of a position of an object that is detected using light reflected off the object. Therefore, in the case where a user views a long address book or long contents of an email in a mobile terminal, which uses the optical joystick, the user of the mobile terminal is inconvenienced by having to repeat the same operation, as illustrated in FIG. 1B.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for providing a continuous key operation of a mobile terminal that uses an input unit for detecting position movement according to a change of an input signal.

Another aspect of the present invention is to provide a method and an apparatus for providing a continuous key operation in cooperation with a separate key button that is independent of an input unit in a mobile terminal, which uses the input unit for detecting position movement according to a change of an input signal.

Still another aspect of the present invention is to provide a method and an apparatus for providing a continuous key operation in cooperation with a separate key button that is independent of an optical mouse in a mobile terminal that uses the optical mouse.

Yet another aspect of the present invention is to provide a method and an apparatus for providing a continuous key operation in cooperation with a separate key button independent of a touchpad in a mobile terminal that uses the touchpad.

In accordance with an aspect of the present invention, a method for providing a continuous key operation in a mobile terminal that uses an input unit for detecting position movement of an object relative to the input unit according to a change of an input signal is provided. The method includes determining whether position movement is detected through the input unit, when the position movement is detected, determining whether a continuous operation control key is actuated within a predefined time, and when the continuous operation control key is actuated within the predefined time, repeatedly performing an operation corresponding to the detected position movement.

In accordance with another aspect of the present invention, a method for providing a continuous operation in a mobile terminal that detects position movement of an object relative to the input unit according to a change of an input signal is provided. The method includes determining whether position movement is detected through an input unit, when the position movement is detected, determining whether a continuous operation control key is actuated, simultaneously with the detection of the position movement, for a predefined time or more, and when the continuous operation control key continues to be actuated for the predefined time or more, repeatedly performing an operation corresponding to the detected position movement.

In accordance with another aspect of the present invention, a mobile terminal is provided. The mobile terminal includes an input unit for detecting position movement of an object relative to the input unit according to a change of an input signal, a keypad for receiving at least one of letter information, numerical information, and control information corresponding to an actuation of a key button, and a controller for performing a control to repeat an operation corresponding to the position movement using position movement detected through the input unit and input information corresponding to the actuation of a continuous operation control key provided via the keypad.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawing is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention include techniques for providing a continuous key operation in a mobile terminal that uses an input unit for recognizing position movement according to a change of an input signal. Here, examples of the input unit include an optical mouse, a touch-screen, and the like.

Figure 1A:
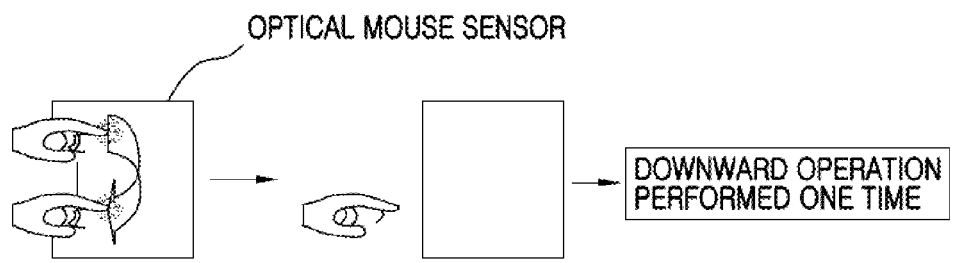
FIGS. 1A and 1B are views illustrating directional key operations using an optical mouse according to the conventional art.
Figure 1B:
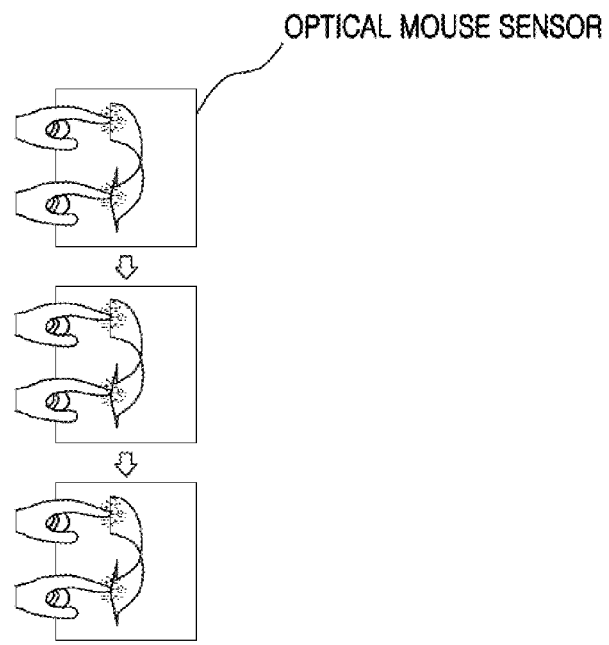
Figure 2:
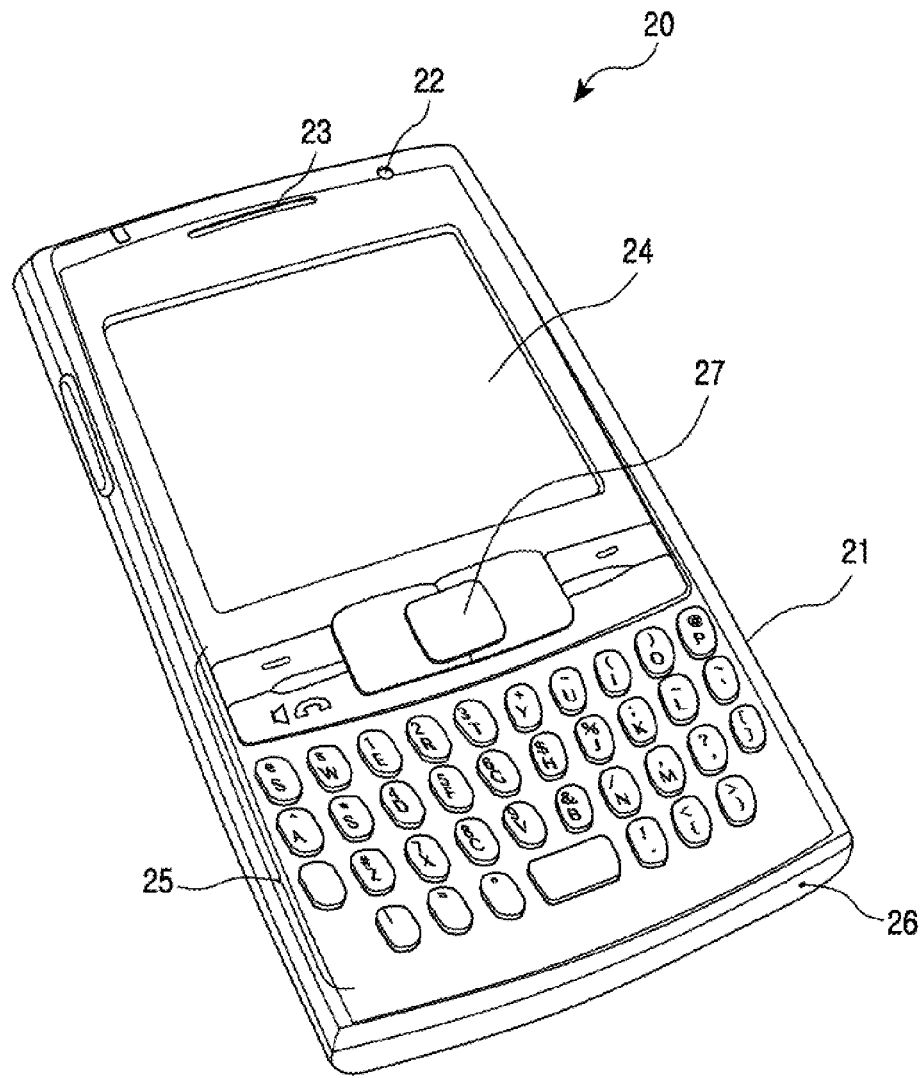
FIG. 2 is a perspective view illustrating a mobile terminal according to an exemplary embodiment of the present invention.

FIG. 2 is a perspective view illustrating a mobile terminal according to an exemplary embodiment of the present invention.

Referring to FIG. 2, a bar type mobile terminal is illustrated by way of example. Note that exemplary embodiments of the present invention are applicable to various types of mobile terminals, such as a slide type mobile terminal, a flip type mobile terminal, a folder type mobile terminal, a slide and rotation type mobile terminal, and the like. In addition, for the sake of convenience in explanation, exemplary embodiments assume that the mobile terminal uses an optical mouse as the input unit for detecting position movement according to a change of an input signal.

As illustrated in FIG. 2, the mobile terminal 20 has a body 21 having a bar type form factor, which includes a display unit 24 for outputting data, a speaker phone unit 23 for outputting audio from a counterpart user, a camera unit 22 for capturing images of an object, and a microphone unit 26 for capturing audio for the counterpart user.

More particularly, the body 21 includes a keypad assembly 25 and an optical mouse unit 27 which are data input units. The keypad assembly 25 includes at least one of directional key buttons, letter key buttons, and numerical key buttons. In addition, the optical mouse unit 27 may be an optical joystick used for moving a cursor on a screen of the display unit 24 by detecting movement of a finger. Alternatively, the optical mouse unit 27 may be used for moving the screen image.

Figure 3:
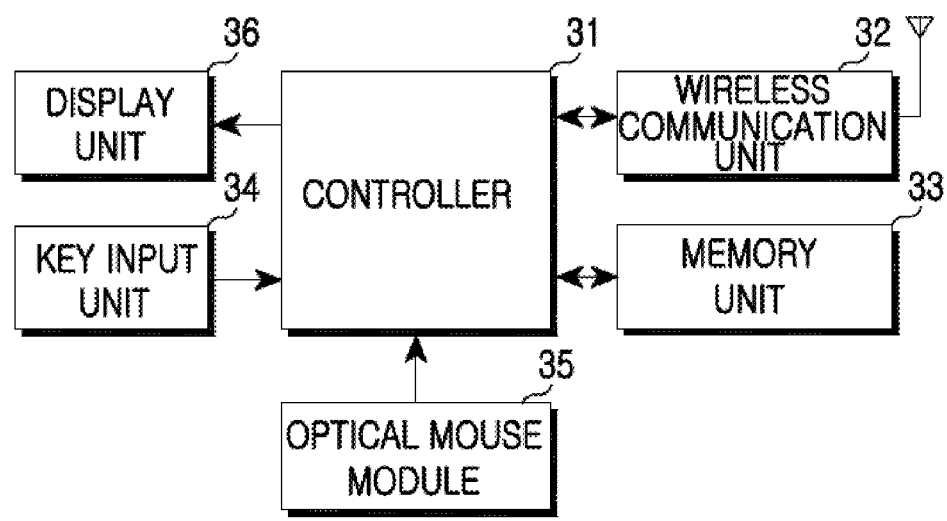
FIG. 3 is a block diagram illustrating a mobile terminal according to an exemplary embodiment of the present invention.

FIG. 3 is a block diagram illustrating a mobile terminal according to an exemplary embodiment of the present invention.

Referring to FIG. 3, a controller 31 controls overall operations of the mobile terminal. For example, the controller 31 processes and controls voice communication and data communication. More particularly, the controller 31 performs control to provide a continuous key operation in cooperation with a continuous operation control key provided by an optical mouse module 35 and a key input unit 34. For example, when continuous operation control key information is provided from the key input unit 34 within a predefined time after an interrupt signal representing an input change is generated by the optical mouse module 35, the controller 31 provides a continuous operation in a coordinate change direction based on the interrupt signal.

A wireless communication unit 32 performs a wireless communication function of the mobile terminal.

A memory unit 33 stores a program for controlling general operations of the mobile terminal. In addition, the memory unit 33 temporarily stores data generated during the execution of programs. For example, the memory unit 33 may store position information which is detected by an optical sensor of the optical mouse module 36 and generated by the movement of a finger.

The key input unit 34 includes keys for inputting number and letter information, and various function keys. More particularly, the key input unit 34 may include a continuous operation control key for controlling a continuous key operation in cooperation with the optical mouse module 35. Here, the continuous operation control key may be one of the keys for inputting the numbers and letters, and the various function keys, or may be a dedicated key for controlling the continuous operation.

The optical mouse module 35 generates an interrupt signal for providing a screen cursor or directional key operation according to an image (fingerprint shape or characteristic of a finger surface) change by detecting the image change using light generated from a light source. Here, the optical mouse module 35 may be an optical joystick.

A display unit 36 displays an image signal on a screen, and displays user data output from the controller 31. For example, the display unit 36 may be a Liquid Crystal Display (LCD).

More particularly, the display unit 36 may be a touchscreen through which number and letter information may be input.

In the above exemplary embodiment, the mobile terminal controls a continuous key operation using the optical mouse module 35 under control of the controller 31. In an exemplary embodiment of the present invention, the mobile terminal may control a continuous key operation by allowing the optical mouse module 35 to receive continuous operation control key information via the key input unit 34.

Figure 4:
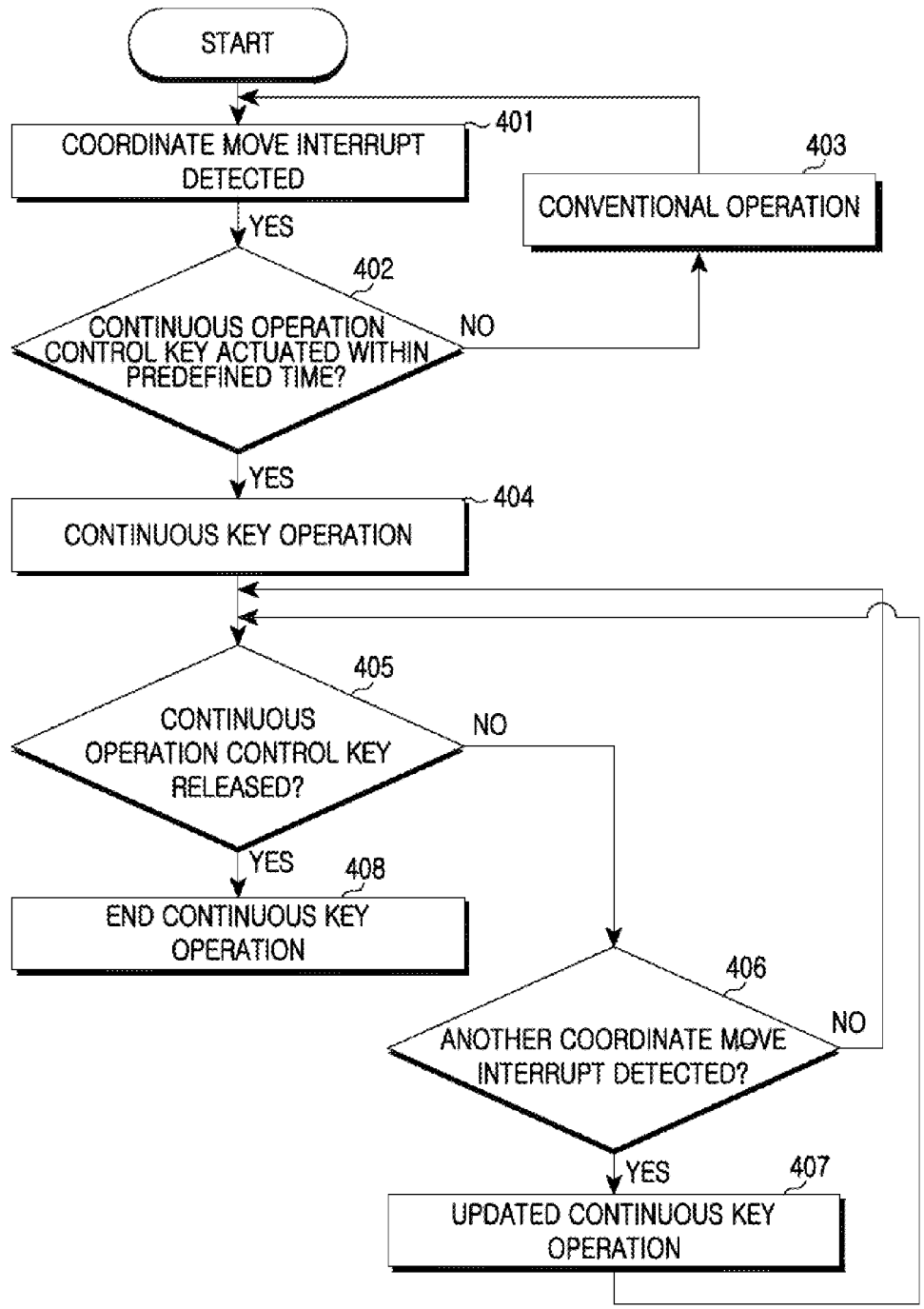
FIG. 4 is a flowchart illustrating an operation according to an exemplary embodiment of the present invention.

FIG. 4 is a flowchart illustrating a continuous key operation according to an exemplary embodiment of the present invention.

Referring to FIG. 4, in step 401, the controller 31 detects a coordinate move interrupt corresponding to a coordinate change through the optical mouse module.

In step 402, the controller 31 determines whether a continuous operation control key button is actuated by a user within a predefined time for a continuous key operation.

When the actuation of the continuous operation control key button is not detected within the predefined time, the controller 31 controls the movement of a cursor or screen according to the coordinate move interrupt in step 403. In addition, when detecting the actuation of the continuous operation control key button after the predefined time, the controller 31 may perform select and run operations on relevant contents based on the detected actuation of the continuous operation control key button.

When detecting the actuation of the continuous operation control key button within the predefined time in step 402, the controller 31 may perform a continuous key operation that repeats an operation corresponding to the coordinate move interrupt signal in step 404. For example, in a case of performing a directional key operation according to an interrupt signal, the controller 31 performs a scroll function with respect to a relevant direction.

In step 405, the controller 31 determines whether the actuation of the continuous operation control key button is discontinued (released).

When detecting the release of the continuous operation control key button, the controller 31 ends the continuous key operation in step 408.

When the continuous operation control key button remains actuated, the controller 31 determines whether another coordinate move interrupt is detected in step 406.

When the other coordinate move interrupt is detected, the controller 31 changes the continuous key operation to an operation corresponding to the other coordinate move interrupt in step 407.

When the other coordinate move interrupt is not detected in step 406, the controller 31 returns to step 405 and detects whether the continuous operation control key button is released while maintaining the set continuous key operation.

Figure 5:
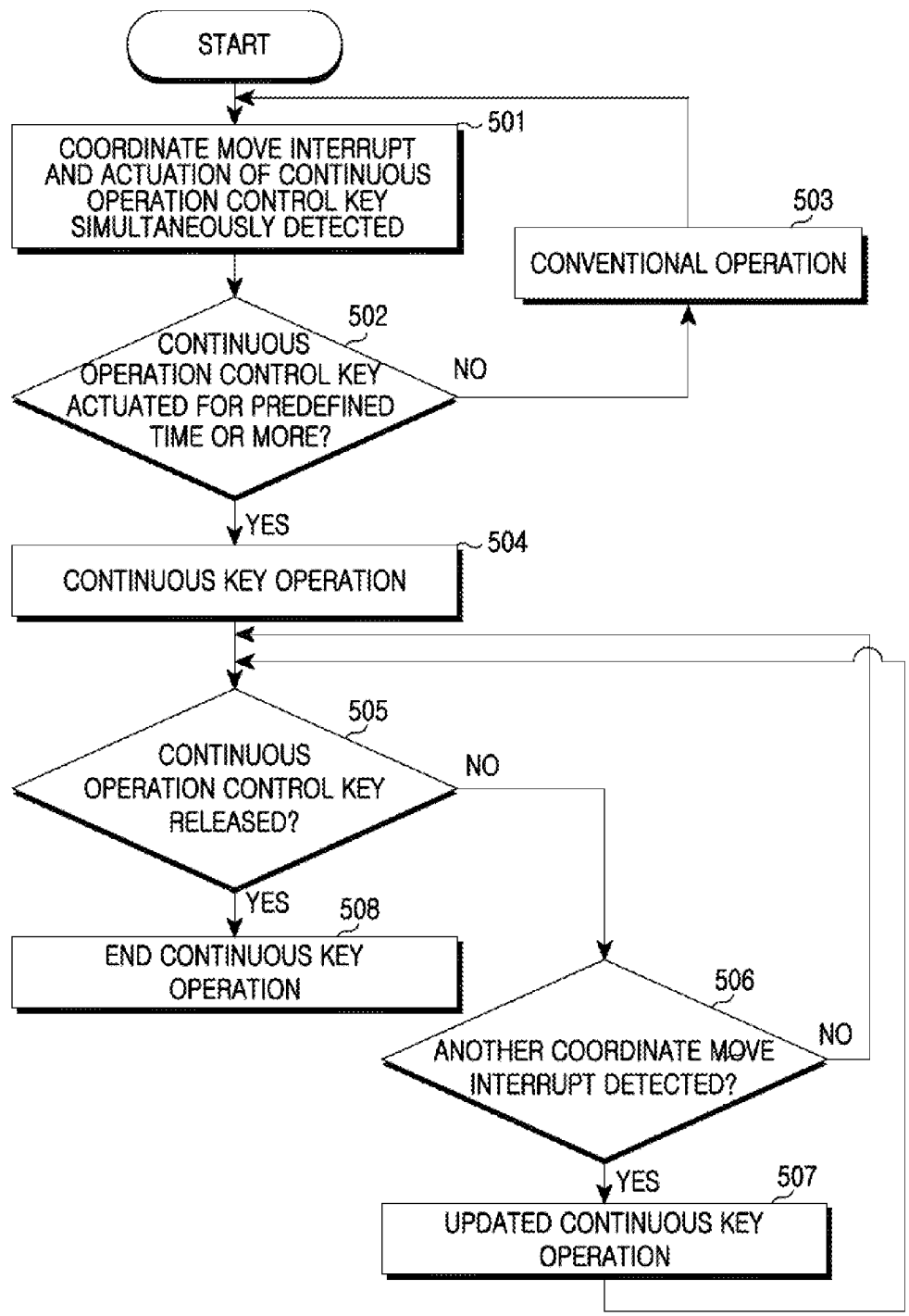
FIG. 5 is a flowchart illustrating a continuous key input operation according to an exemplary embodiment of the present invention.

FIG. 5 is a flowchart illustrating a continuous key operation according to an exemplary embodiment of the present invention.

Referring to FIG. 5, in step 501, when a coordinate move interrupt with respect to a coordinate change is detected through an optical mouse module, the controller 31 simultaneously detects position movement and the actuation of a continuous operation control key button.

In step 502, the controller 31 determines whether the continuous operation control key button is actuated by a user for a predefined time or more to trigger the continuous key operation.

When the actuation of the continuous operation control key button is not detected for the predefined time or more, the controller 31 moves a cursor or screen according to the coordinate move interrupt in step 503. When the actuation of the continuous operation control key button is detected within the predefined time, the controller 31 may perform select and run operations on relevant contents based on the detected actuation of the continuous operation control key button.

When the actuation of the continuous operation control key button is detected for the predefined time or more in step 502, the controller 31 performs a continuous key operation that repeats an operation corresponding to the coordinate move interrupt signal in step 504. For example, in a case of performing a directional key operation according to an interrupt signal, the controller 31 performs a scroll function with respect to a relevant direction.

In step 505, the controller 31 determines whether the actuation of the continuous operation control key button is discontinued (released).

When detecting that the continuous operation control key button is released, the controller 31 ends the continuous key operation in step 508.

When the continuous operation control key button remains actuated, the controller 31 determines whether another coordinate move interrupt is detected in step 506.

When the other coordinate move interrupt is detected, the controller 31 changes the continuous key operation to an operation corresponding to the other coordinate move interrupt in step 507.

When the other coordinate move interrupt is not detected in step 506, the controller 31 returns to step 505 and detects whether the continuous operation control key button is released while maintaining the set continuous key operation.

Figure 6:
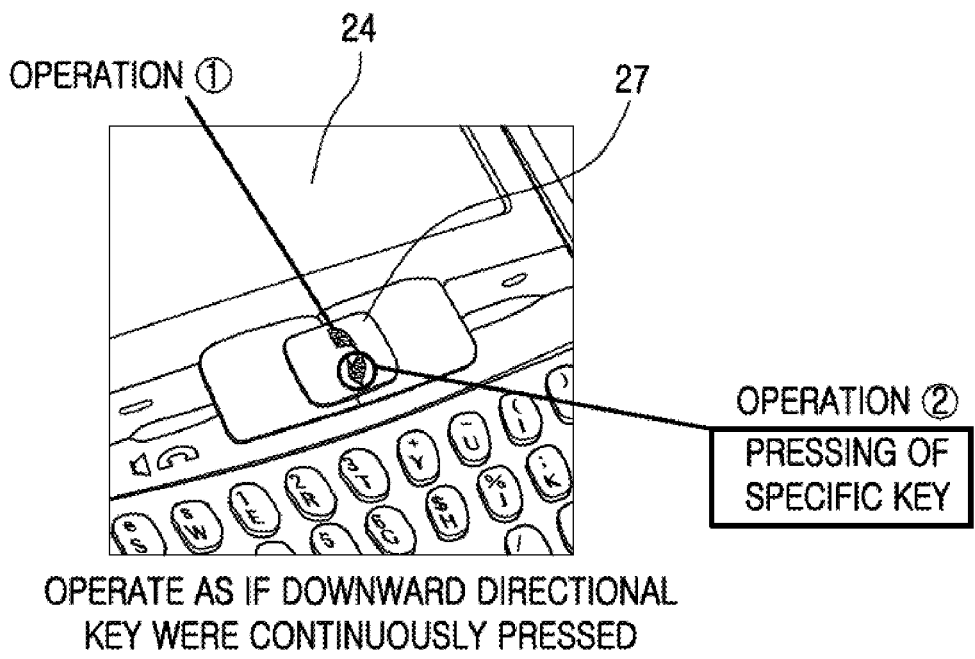
FIG. 6 is a view illustrating a continuous key input operation for continuous screen scroll according to an exemplary embodiment of the present invention.

FIG. 6 is a view illustrating a continuous key input operation for continuous screen scroll according to an exemplary embodiment of the present invention.

Referring to FIG. 6, a user moves his finger in a direction (here, downward direction) in which a scroll is desired (operation ①) on an optical mouse sensor of the optical mouse module 27. It is possible to perform the scroll in the downward direction once, with only the operation ①. In the case of operation ② where the user presses a continuous operation control key button within a predefined time after the operation ①, the mobile terminal performs a continuous key operation that repeats the scroll in the downward direction, that is, in which scroll is continuously performed in the downward direction. After that, when the user releases the relevant key button, the continuous key operation is ended.

The relevant key button that is pressed after the predefined time subsequent to the operation ① will be recognized as an already input key. That is, after the initial scroll is performed, a preset input operation of the relevant key button will be performed.

More particularly, since the relevant key button may be located in a vertically lower side of the optical mouse, the continuous key operation may be performed easily.

According to an exemplary embodiment of the present invention, a mobile terminal which uses an input unit for detecting position movement according to a change of an input signal provides convenience to a user who uses a directional key service through an optical mouse and a touchscreen by providing a continuous key operation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a continuous key operation in a mobile terminal that uses an input unit for detecting position movement of an object relative to the input unit according to a change of an input signal, the method comprising:
   determining whether position movement is detected through the input unit;
   when the position movement is detected, determining whether a continuous operation control key is actuated within a predefined time;
   when the continuous operation control key is actuated within the predefined time, repeatedly performing an operation corresponding to the detected position movement;
   determining whether another position movement is detected while the continuous operation control key is actuated; and
   when it is determined that the other position movement is detected while the continuous operation control key is actuated, changing a direction corresponding to the detected position movement towards another direction of the other position movement.

2. The method of claim 1, wherein the repeatedly performing of the operation corresponding to the detected position movement comprises maintaining the actuation of the continuous operation control key that is actuated within the predefined time after the position movement is detected through the input unit.

3. The method of claim 2, further comprising, when the continuous operation control key is released, ending the repeatedly performing of the operation corresponding to the detected position movement.

4. The method of claim 1, further comprising, when the continuous operation control key is released, ending the repeatedly performing of the operation corresponding to the detected position movement.

5. The method of claim 1, further comprising:
   determining whether another position movement is detected through the input unit during the repeatedly performing of the operation corresponding to the detected position movement; and
   when the other position movement is detected, repeatedly performing an operation corresponding to the other position movement.

6. The method of claim 1, wherein when the continuous operation control key is not actuated within the predefined time, the operation corresponding to the detected position movement is performed only once.

7. The method of claim 1, wherein the input unit comprises one of an optical mouse and a touchscreen.

8. The method of claim 1, wherein the continuous operation control key comprises one of key buttons for inputting letter information, numerical information, and control information, and a dedicated key button for a repeated operation corresponding to the position movement.

9. A method for providing a continuous operation in a mobile terminal that detects position movement of an object relative to the input unit according to a change of an input signal, the method comprising:
   determining whether position movement is detected through an input unit;
   when the position movement is detected, determining whether a continuous operation control key is actuated, simultaneously with the detection of the position movement, for a predefined time or more;
   when the continuous operation control key continues to be actuated for the predefined time or more, repeatedly performing an operation corresponding to the detected position movement;
   determining whether another position movement is detected while the continuous operation control key is actuated; and
   when it is determined that the other position movement is detected while the continuous operation control key is actuated, changing a direction corresponding to the detected position movement towards another direction of the other position movement.

10. The method of claim 9, wherein the determining of whether the continuous operation control key continues to be actuated for the predefined time or more comprises, when the position movement is detected, determining whether the continuous operation control key continues to be actuated for the predefined time or more without detection of another position movement.

11. The method of claim 9, further comprising:
    determining whether another position movement is detected through the input unit during the repeatedly performing of the operation corresponding to the detected position movement; and
    when the other position movement is detected, repeatedly performing an operation corresponding to the other position movement.

12. The method of claim 9, wherein when the continuous operation control key does not continue to be actuated for the predefined time or more, the operation corresponding to the detected position movement is performed only once.

13. The method of claim 9, wherein the continuous operation control key comprises one of key buttons for inputting letter information, numerical information, and control information, and a dedicated key button for a repeated operation corresponding to the position movement.

14. The terminal of claim 13, wherein the input unit comprises one of an optical mouse and a touchscreen.

15. A mobile terminal, the terminal comprising:
    an input unit for detecting position movement of an object relative to the input unit according to a change of an input signal;
    a keypad for receiving at least one of letter information, numerical information, and control information corresponding to an actuation of a key button; and
    a controller for performing a control to repeat an operation corresponding to the position movement using position movement detected through the input unit and input information corresponding to the actuation of a continuous operation control key provided via the keypad,
    wherein the controller determines whether another position movement is detected while the continuous operation control key is actuated, and
    wherein, when the controller determines that the other position movement is detected while the continuous operation control key is actuated, the controller changes a direction corresponding to the detected position movement towards another direction of the other position movement.

16. The terminal of claim 15, wherein, when the continuous operation control key is one of actuated and continued to be actuated within a predefined time after the position movement is detected by the input unit, the controller performs a control to repeat the operation corresponding to the position movement.

17. The terminal of claim 16, wherein when the continuous operation control key is not actuated within the predefined time, the controller performs the operation corresponding to the detected position movement only once.

18. The terminal of claim 16, wherein when the continuous operation control key is released, the controller performs a control to end the repeating of the operation corresponding to the position movement.

19. The terminal of claim 16, wherein when another position movement is detected through the input unit while the controller performs a control to repeat the operation corresponding to the position movement, the controller performs a control to repeat an operation corresponding to the other position movement.

20. The terminal of claim 15, wherein, when the continuous operation control key is actuated simultaneously with the detecting of the position movement, and the continuous operation control key continues to be actuated for a predefined time or more after the position movement is detected through the input unit, the controller repeatedly performs the operation corresponding to the position movement.

21. The terminal of claim 20, wherein when the continuous operation control key does not continue to be actuated for the predefined time or more, the controller performs the operation corresponding to the detected position movement only once.

22. The terminal of claim 20, wherein when the continuous operation control key is released, the controller performs a control to end the repeating of the operation corresponding to the position movement.

23. The terminal of claim 20, wherein when another position movement is detected through the input unit while the controller performs a control to repeat the operation corresponding to the position movement, the controller performs a control to repeat an operation corresponding to the other position movement.

* * * * *